United States Patent [19]
Sohn

[11] Patent Number: 5,467,140
[45] Date of Patent: Nov. 14, 1995

[54] VERTICAL SYNCHRONOUS SIGNAL SEPARATION APPARATUS

[75] Inventor: Ki S. Sohn, Kyungki-Do, Rep. of Korea

[73] Assignee: Goldstar Electron Co., Ltd., Choongchungbook-Do, Rep. of Korea

[21] Appl. No.: 287,330

[22] Filed: Aug. 8, 1994

[30] Foreign Application Priority Data

Aug. 13, 1993 [KR] Rep. of Korea .................. 15715

[51] Int. Cl.⁶ .................. H04N 5/08; H04N 5/10
[52] U.S. Cl. .................. 348/529; 348/525
[58] Field of Search .................. 348/529, 525, 348/500; 358/148, 153, 154; H04N 5/10, 5/04, 5/08

[56] References Cited

U.S. PATENT DOCUMENTS 3,925,613  12/1975  Kokudo .................. 348/529

*Primary Examiner*—David E. Harvey
*Attorney, Agent, or Firm*—Lowe, Price, LeBlanc & Becker

[57] ABSTRACT

A vertical synchronous signal separation circuit is disclosed wherein the circuit includes a vertical synchronous pulse removal circuit for delaying original horizontal and vertical synchronous signals separated from a composite video signal by a predetermined time period in response to a reference clock signal and logically combining the original horizontal and vertical synchronous signals with the delayed horizontal and vertical synchronous signals to remove vertical synchronous pulses therefrom, a clock generator for logically combining an output signal from the vertical synchronous pulse removal circuit with the reference clock signal to generate a clock signal, an edge detector for detecting edges of the output signal from the vertical synchronous pulse removal circuit and outputting the detected edges as a reset signal, and a vertical synchronous signal extractor for extracting a stable vertical synchronous signal from the original horizontal and vertical synchronous signals in response to the clock signal from the clock generator and the reset signal from the edge detector.

6 Claims, 5 Drawing Sheets

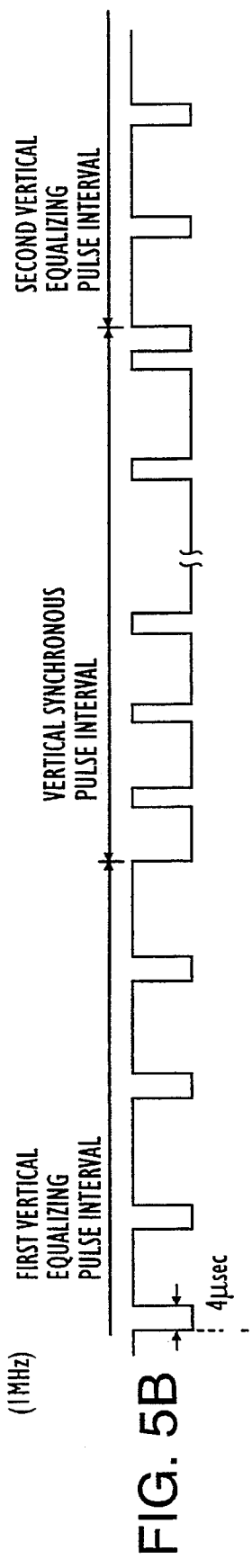

VERTICAL SYNCHRONOUS SIGNAL SEPARATION APPARATUS

BACKGROUND OF THE INVENTION

1. Field of the Invention

The present invention relates in general to the separation of a vertical synchronous signal from a composite video signal inputted to a television receiver (TV), and more particularly to a vertical synchronous signal separation apparatus in which the vertical synchronous signal is stably separated from the composite video signal in a digital manner, so that a circuit integration can readily be implemented.

2. Description of the Prior Art

Referring to FIG. 1, there is shown a circuit diagram of a conventional vertical synchronous signal separation apparatus employing an analog manner. As shown in this drawing, the conventional vertical synchronous signal separation apparatus comprises a synchronous signal separation circuit 1 for separating horizontal and vertical synchronous signals from a composite video signal CVS inputted to a TV receiver, an integration circuit 2 for integrating the horizontal and vertical synchronous signals from the synchronous signal separation circuit 1, and a comparator 3 for comparing an output signal from the integration circuit 2 with a reference voltage Vref. The integration circuit 2 includes a resistor R1 and a capacitor C1.

The operation of the conventional vertical synchronous signal separation apparatus with the above-mentioned construction will hereinafter be described with reference to FIG. 1 and FIGS. 2A to 2D, in which FIG. 2A is a waveform diagram of the composite video signal CVS, FIG. 2B is a waveform diagram of the horizontal and vertical synchronous signals from the synchronous signal separation circuit 1, FIG. 2C is a waveform diagram of the output signal from the integration circuit 2 and the reference voltage Vref which are applied to the comparator 3, and FIG. 2D is a waveform diagram of an output signal from the comparator 3.

Upon receiving the composite video signal CVS as shown in FIG. 2A, the synchronous signal separation circuit 1 removes luminance and color signals from the received composite video signal CVS and outputs the remaining horizontal and vertical synchronous signals as shown in FIG. 2B to the integration circuit 2.

In the case where a time constant of the resistor R1 and the capacitor C1 of the integration circuit 2 is adjusted to a vertical equalizing pulse period, a high duration (28 μsec) of each of vertical equalizing pulses is much longer than a low duration (4 μsec) thereof in a first vertical equalizing pulse interval of the horizontal and vertical synchronous signals. In this case, the capacitor C1 of the integration circuit 2 is charged in the first vertical equalizing pulse interval to maintain each high duration in an interval X as shown in FIG. 2C.

On the other hand, in a vertical synchronous pulse interval, a low duration of each of vertical synchronous pulses is much longer than a high duration thereof. As a result, the capacitor C1 of the integration circuit 2 is discharged in an interval Y as shown in FIG. 2C. In a second vertical equalizing pulse interval, the capacitor C1 of the integration circuit 2 is again charged in an interval Z as shown in FIG. 2C in a similar manner to that in the first vertical equalizing pulse interval.

The horizontal and vertical synchronous signals from the synchronous signal separation circuit 1 are processed in the above manner by the integration circuit 2 and then compared with the reference voltage Vref by the comparator 3. If the output signal from the integration circuit 2 is greater than the reference voltage Vref, the output of the comparator 3 is high in level as shown in FIG. 2D. On the contrary, if the output signal from the integration circuit 2 is smaller than the reference voltage Vref, the output of the comparator 3 is low in level as shown in FIG. 2D. Therefore, the vertical synchronous signal is extracted as shown in FIG. 2D.

However, the above-mentioned conventional vertical synchronous signal separation apparatus has a disadvantage in that it has the resistor and the capacitor as individual devices making a circuit integration difficult and, thus, resulting in an increase in the cost. Also, a glitch is present in a portion (A in FIG. 2C) of the reference voltage of the comparator. This glitch results in faulty operations of other systems.

SUMMARY OF THE INVENTION

Therefore, the present invention has been made in view of the above problems, and it is an object of the present invention to provide a vertical synchronous signal separation apparatus in which a vertical synchronous signal is stably separated from a composite video signal inputted to a TV receiver in a digital manner, so that a circuit integration can readily be implemented.

In accordance with the present invention, the above and other objects can be accomplished by a provision of a vertical synchronous signal separation apparatus comprising vertical synchronous pulse removal means for delaying original horizontal and vertical synchronous signals separated from a composite video signal by a predetermined time period in response to a reference clock signal and logically combining the original horizontal and vertical synchronous signals with the delayed horizontal and vertical synchronous signals to remove vertical synchronous pulses therefrom; clock generation means for logically combining an output signal from said vertical synchronous pulse removal means with the reference clock signal to generate a clock signal; edge detection means for detecting edges of the output signal from said vertical synchronous pulse removal means and outputting the detected edges as a reset signal; and vertical synchronous signal extraction means for extracting a stable vertical synchronous signal from the original horizontal and vertical synchronous signals in response to the clock signal from said clock generation means and the reset signal from said edge detection means.

BRIEF DESCRIPTION OF THE DRAWINGS

The above and other objects, features and advantages of the present invention will be more clearly understood from the following detailed description taken in conjunction with the accompanying drawings, in which:

FIGS. 5A to 5G are waveform diagrams of signals from components in FIG. 4.

DETAILED DESCRIPTION OF THE PREFERRED EMBODIMENT

Figure 1:
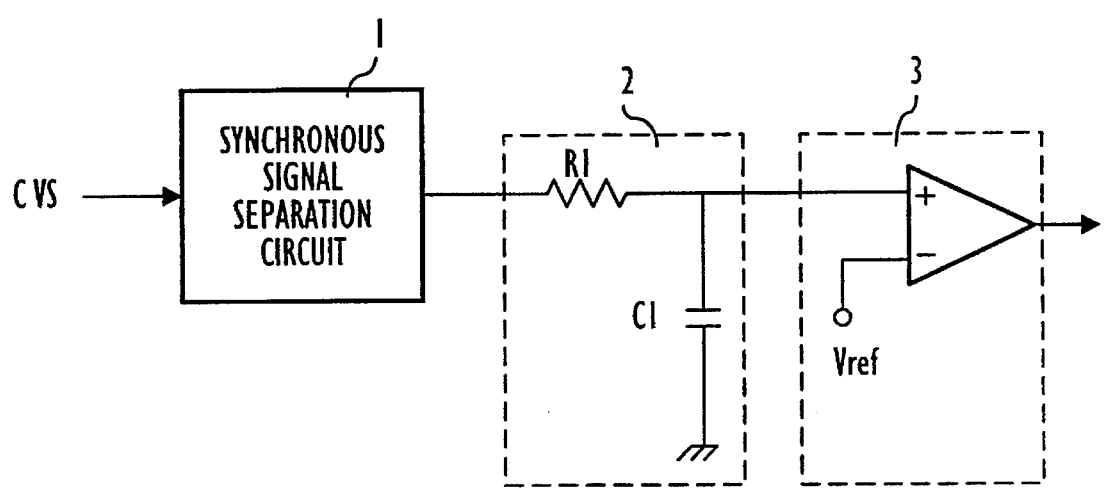
FIG. 1 is a circuit diagram of a conventional vertical synchronous signal separation apparatus employing an analog manner.
Figure 2:
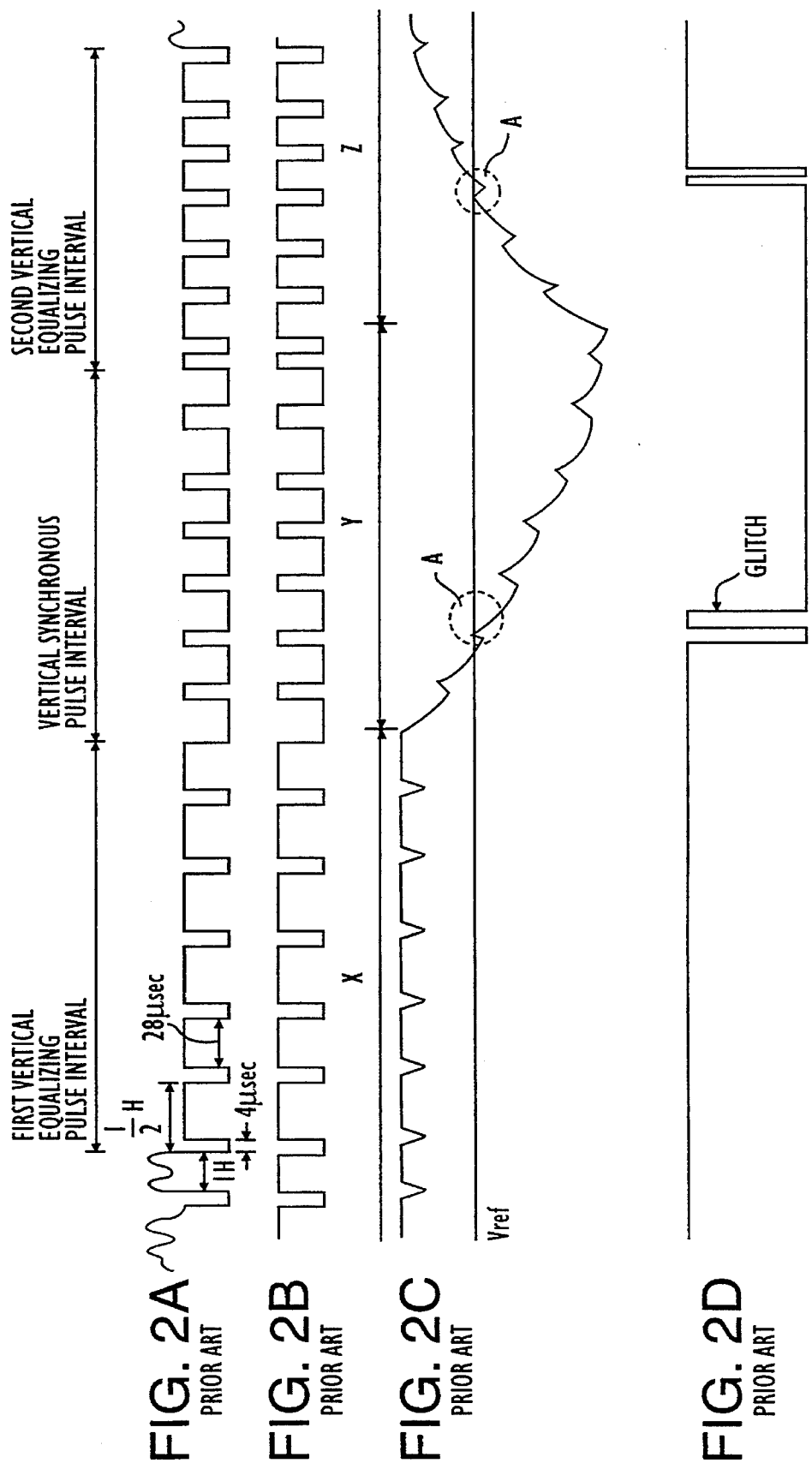
FIGS. 2A to 2D are waveform diagrams of signals from components in FIG. 1.
Figure 3:
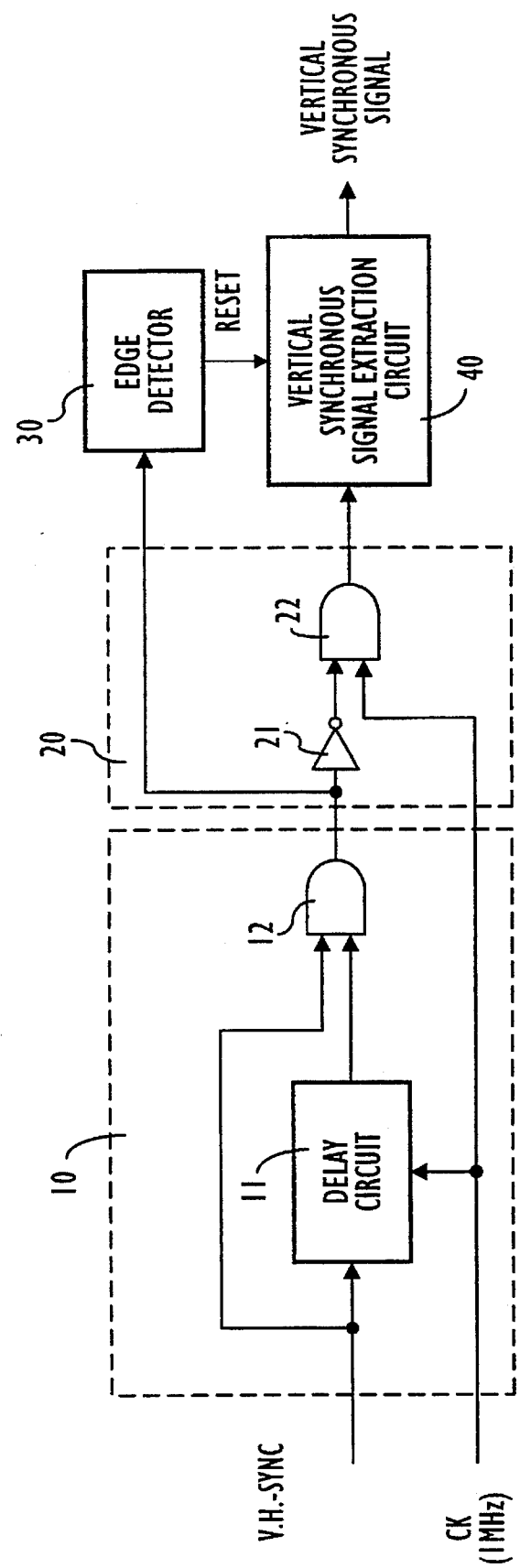
FIG. 3 is a circuit diagram of a vertical synchronous signal separation apparatus employing a digital manner in accordance with the present invention.

Referring to FIG. 3, there is shown a circuit diagram of a vertical synchronous signal separation apparatus employing a digital manner in accordance with the present invention. As shown in this drawing, the vertical synchronous signal separation apparatus comprises a vertical synchronous pulse removal circuit 10 for delaying original horizontal and vertical synchronous signals H and V-Sync separated from a composite video signal by a predetermined time period in response to a reference clock signal CK and logically combining the original horizontal and vertical synchronous signals H and V-Sync with the delayed horizontal and vertical synchronous signals to remove vertical synchronous pulses therefrom. The resultant signal from the vertical synchronous pulse removal circuit 10 is applied to a clock generator 20.

The clock generator 20 is adapted to logically combine the output signal from the vertical synchronous pulse removal circuit 10 with the reference clock signal CK to generate a clock signal and output the generated clock signal to an edge detector 30.

The edge detector 30 is adapted to detect edges of the output signal from the vertical synchronous pulse removal circuit 10 and output the detected edges as a reset signal.

Also, the vertical synchronous signal separation apparatus comprises a vertical synchronous signal extraction circuit 40 for extracting a stable vertical synchronous signal from the original horizontal and vertical synchronous signals H and V-Sync in response to the clock signal from the clock generator 20 and the reset signal from the edge detector 30.

The vertical synchronous pulse removal circuit 10 includes a delay circuit 11 for delaying the horizontal and vertical synchronous signals H and V-Sync by the predetermined time period in response to the reference clock signal CK, and an AND gate 12 for ANDing the original horizontal and vertical synchronous signals H and V-Sync with the delayed horizontal and vertical synchronous signals from the delay circuit 11 to remove the vertical synchronous pulses therefrom.

The clock generator 20 includes an inverter 21 for inverting the output signal from the vertical synchronous pulse removal circuit 10, and an AND gate 22 for ANDing an output signal from the inverter 21 and the reference clock signal CK to generate the clock signal.

Figure 4:
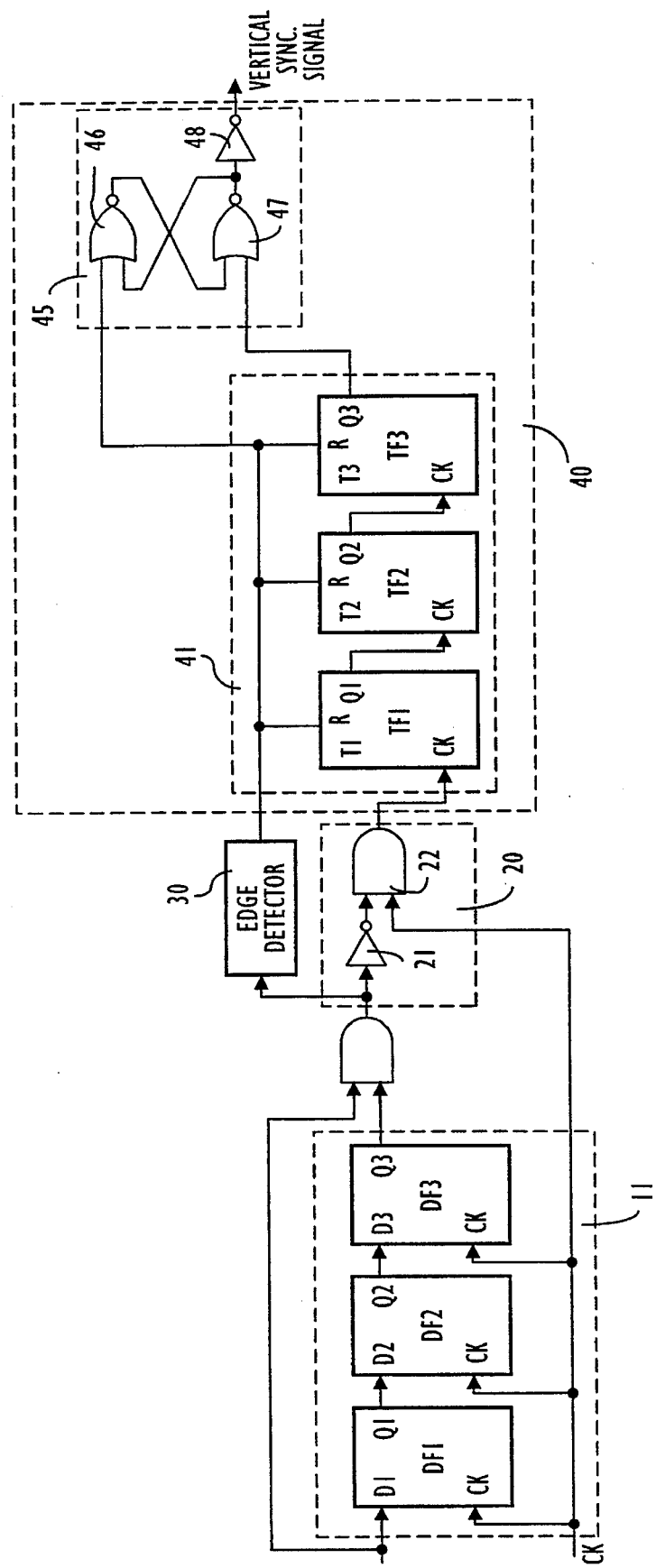
FIG. 4 is a detailed circuit diagram of a vertical synchronous pulse removal circuit and a vertical synchronous signal extraction circuit in FIG. 3.

Referring to FIG. 4, there is shown a detailed circuit diagram of the vertical synchronous pulse removal circuit 10 and the vertical synchronous signal extraction circuit 40 in FIG. 3. As shown in this drawing, the delay circuit 11 includes three D flip-flops DF1–DF3 for delaying the original horizontal and vertical synchronous signals H and V-Sync by the predetermined time period in response to the reference clock signal CK.

The vertical synchronous signal extraction circuit 40 includes an octal counter 41 for counting the clock signal from the clock generator 20 in response to the reset signal from the edge detector 30, and a latch circuit 45 for latching an output signal from the octal counter 41 in response to the reset signal from the edge detector 30 to output the stable vertical synchronous signal.

The octal counter 41 includes three T flip-flops TF1–TF3 for counting the clock signal from the clock generator 20 in response to the reset signal from the edge detector 30.

The latch circuit 45 includes a NOR gate 46 having one input terminal for inputting the reset signal from the edge detector 30, a NOR gate 47 having one input terminal for inputting an output signal from the NOR gate 46, the other input terminal for inputting the output signal from the octal counter 41 and an output terminal connected to the other input terminal of the NOR gate 46, and an inverter 48 for inverting an output signal from the NOR gate 47 to output the stable vertical synchronous signal.

The operation of the vertical synchronous signal separation apparatus with the above-mentioned construction in accordance with the present invention will hereinafter be described in detail with reference to FIGS. 3 and 4 and FIGS. 5A to 5G, in which FIG. 5A is a waveform diagram of the reference clock signal, FIG. 5B is a waveform diagram of the original horizontal and vertical synchronous signals H and V-Sync, FIG. 5C is a waveform diagram of the horizontal and vertical synchronous signals delayed by the delay circuit 11, FIG. 5D is a waveform diagram of an output signal from the AND gate 12, FIG. 5E is a waveform diagram of an output signal from the AND gate 22, FIG. 5F is a waveform diagram of the edges detected by the edge detector 30, and FIG. 5G is a waveform diagram of an output signal from the vertical synchronous signal extraction circuit 40.

First, in the vertical synchronous pulse removal circuit 10, the original horizontal and vertical synchronous signals H and V-Sync as shown in FIG. 5B are delayed by the predetermined time period (8 μsec) as shown in FIG. 5C in response to the reference clock signal (1 MHz) CK as shown in FIG. 5A by the delay circuit 11 which is provided with the three D flip-flops DF1–DF3, and then applied to the AND gate 12, which is also applied with the original horizontal and vertical synchronous signals H and V-Sync. The AND gate 12 ANDs the original horizontal and vertical synchronous signals H and V-Sync with the delayed horizontal and vertical synchronous signals from the delay circuit 11 and outputs the resultant signal to the clock generator 20. As shown in FIG. 5D, the output signal from the AND gate 12 has horizontal synchronous pulses and first and second vertical equalizing pulse intervals of a frequency of double the original one, whereas the vertical synchronous pulses are missing. Here, an interval in which the vertical synchronous pulses are missing is in accord with that of the original vertical synchronous signal.

Then, in the clock generator 20, the output signal from the vertical synchronous pulse removal circuit 10 is inverted by the inverter 21 and then ANDed with the reference clock signal CK by the AND gate 22. As a result, the AND gate 22 outputs the clock signal as shown in FIG. 5E. As shown in FIG. 5E, each clock is generated in a low duration of the signal as shown in FIG. 5D. Here, the number of the clocks generated in the vertical synchronous pulse interval is at least 30 times that of the clocks generated in the first and second vertical equalizing pulse intervals.

The clock signal from the clock generator 20 is applied to the edge detector 30 and the vertical synchronous signal extraction circuit 40. The edge detector 30 detects falling edges of the clock signal from the clock generator 20 as shown in FIG. 5F. The falling edges detected by the edge detector 30 are applied as the reset signal to the octal counter 41 and the latch circuit 45 in the vertical synchronous signal extraction circuit 40.

In the case where the clocks in the first vertical equalizing pulse interval as shown in FIG. 5E are applied to the octal counter 41 which is comprised of the three T flip-flops TF1–TF3, a most significant bit (MSB) output of the octal counter 41 is always low in level because the octal counter 41 is reset in response to the reset signal from the edge detector 30 before the MSB output thereof becomes logical "1". In the case where the clocks in the vertical synchronous pulse interval as shown in FIG. 5E are applied to the octal counter 41, the MSB output of the octal counter 41 goes high when the number of the clocks exceeds a predetermined value. Then, the output signal from the octal counter 41 produced in the horizontal and vertical synchronous pulse intervals in the above manner is applied to the NOR gate 47 in the latch circuit 45, while the reset signal from the edge detector 30 is applied to the NOR gate 46 in the latch circuit 45. In the latch circuit 45, the inputted signals are logically combined by the NOR gates 46 and 47 and the inverter 48. As a result, the inverter 48 in the latch circuit 45 outputs the stable vertical synchronous signal which is high in level in only the vertical synchronous pulse interval, whereas low in other intervals, as shown in FIG. 5G. In this manner, at the final output stage, the stable vertical synchronous signal is extracted with the horizontal synchronous signal removed.

As apparent from the above description, according to the present invention, the vertical synchronous signal separation is performed in the digital manner, resulting in the removal of the glitch being generated in that employing the analog manner. Therefore, there can be produced the stable vertical synchronous signal. Also, the vertical synchronous signal separation apparatus of the present invention does not have to employ the capacitor for the separation of the low frequency. This has the effect of reducing a circuit integration area.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A vertical synchronous signal separation apparatus comprising:

vertical synchronous pulse removal means for delaying original horizontal and vertical synchronous signals separated from a composite video signal by a predetermined time period in response to a reference clock signal and logically combining the original horizontal and vertical synchronous signals with the delayed horizontal and vertical synchronous signals to remove vertical synchronous pulses therefrom;

clock generation means for logically combining an output signal from said vertical synchronous pulse removal means with the reference clock signal to generate a clock signal;

edge detection means for detecting edges of the output signal from said vertical synchronous pulse removal means and outputting the detected edges as a reset signal; and vertical synchronous signal extraction means for extracting a stable vertical synchronous signal from the original horizontal and vertical synchronous signals in response to the clock signal from said clock generation means and the reset signal from said edge detection means.

2. A vertical synchronous signal separation apparatus as set forth in claim 1, wherein said vertical synchronous pulse removal means includes:

delay means for delaying the original horizontal and vertical synchronous signals by the predetermined time period in response to the reference clock signal; and an AND gate for ANDing the original horizontal and vertical synchronous signals with the delayed horizontal and vertical synchronous signals from said delay means to remove the vertical synchronous pulses therefrom.

3. A vertical synchronous signal separation apparatus as set forth in claim 2, wherein said delay means includes:

a plurality of D flip-flops for delaying the original horizontal and vertical synchronous signals by the predetermined time period in response to the reference dock signal.

4. A vertical synchronous signal separation apparatus as set forth in claim 1, wherein said vertical synchronous signal extraction means includes:

counting means for counting the clock signal from said clock generation means in response to the reset signal from said edge detection means; and latch means for latching an output signal from said counting means in response to the reset signal from said edge detection means to output the stable vertical synchronous signal.

5. A vertical synchronous signal separation apparatus as set forth in claim 4, wherein said counting means includes:

an octal counter having a plurality of T flip-flops for counting the clock signal from said clock generation means in response to the reset signal from said edge detection means.

6. A vertical synchronous signal separation apparatus as set forth in claim 5, wherein said latch means includes:

a first NOR gate having one input terminal for inputting the reset signal from said edge detection means;

a second NOR gate having one input terminal for inputting an output signal from said first NOR gate, the other input terminal for inputting an output signal from said octal counter and an output terminal connected to the other input terminal of said first NOR gate; and an inverter for inverting an output signal from said second NOR gate to output the stable vertical synchronous signal.

* * * * *